ent Office 2,971,914
Patented Feb. 14, 1961

2,971,914

THICKENED OIL COMPOSITIONS CONTAINING ALKYLENE HIGHER FATTY ACID DIAMIDES

Milton J. Shoemaker, Madison, Wis., assignor to Research Products Corporation, Madison, Wis.

No Drawing. Filed Oct. 14, 1957, Ser. No. 689,746

10 Claims. (Cl. 252—51.5)

This invention relates to thixotropic or thickened oil compositions and more particularly refers to such compositions produced by the dispersion of an alkylene higher fatty acid diamide in an oil.

Thickened oil compositions have found uses in many fields. In the pharmaceutical field they are used as bases for salves and ointments. In the cosmetic field they are used as bases for cosmetic creams. In the lubricating field they are used as greases and other lubricants where thixotropic properties are beneficial. In other commercial fields they are used in various applications such as adhesives for impingement type air filters.

A number of compositions for such uses are known. Some have been produced from mixtures containing petrolatum, lanolin, and mixtures of beeswax. These products have had the draw-back that the processing required extensive mixing and milling, consuming an excessive amount of time and labor, and additionally requiring considerable space for plant and machinery facilities. They have had a further draw-back in that the oils tend to separate or segregate upon standing, especially at warmer temperatures. Additionally, viscosity and consistency of the mixtures have not been constant over a period of time.

Other compositions have been disclosed where polyethylene, microcrystalline wax, or hydrogenated castor oil is used as a thickener. However, these compositions are unstable at higher temperatures and have a tendency to bleed upon standing at those temperatures. Additionally, they are not compatible with a number of desirable oils.

It is an object of the present invention to provide viscous oil compositions having improved consistency and stability.

It is a further object to provide such compositions which are thixotropic.

It is a further object to provide thickened oil compositions which maintain their consistency and other physical properties over a wide range of temperatures and especially at elevated temperatures.

It is still a further object to provide modifying agents which are compatible with a large number of oils and which can be used with such oils to produce a wide variety of thickened compositions.

It is still further an object of the present invention to provide compositions which are readily manufactured with readily available equipment and plant facilities, and which require the expenditure of relatively little time and labor.

Further objects of the invention will be apparent from the following description and the specific working examples provided.

It has now been found that a thickened oil composition may be produced having a homogeneous consistency which is retained for a long period of time and over a wide range of temperatures by dispersing into a suitable oil a minor proportion of a thickening agent having the structural formula:

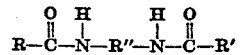

where R and R' are alkyl groups and R" is an alkylene group; dissolving the thickening agent in the oil at an elevated temperature and then cooling the solution. It has been found especially advantageous to heat the solution to a point above the cloud point and then rapidly cool it to a temperature lower than the cloud temperature. At this lower temperature the thickening agent is not substantially soluble in the oil.

Rapid cooling, sometimes referred to as shock-cooling, results in the dispersion of the thickening agent in the form of minute particles too small to be seen in the compound microscope. As a consequence a thixotropic composition is formed which is stable and does not bleed.

In the above formula, when R and R' each contain from 15–17 carbon atoms and R" contains from 1–4 carbon atoms the optimum properties are attained. Because of their availability, the palmityl or stearyl derivatives are preferred. With respect to the alkylene group, the methylene and ethylene derivatives are preferred.

Among the compounds which may be used as the thickeners of the present invention and which are commercially available are "Armowax" (N,N'-methylene bis-stearamide), "Acrawax C" (N,N'-ethylene bis-stearamide), and "Advawax" (N,N'-ethylene bis-stearamide). Other compounds included in the above formula may also be used, among which are N,N'-propylene bis-stearamide, N,N'-butylene bis-stearamide, N,N'-methylene bis-palmitamide, N,N'-ethylene bis-palmitamide, N,N'-propylene bis-palmitamide, N,N'-butylene bis-palmitamide, N,N'-methylene bis-margaramide, N,N'-ethylene bis-margaramide, N,N'-propylene bis-margaramide, and N,N'-butylene bis-margaramide. Additionally diamides formed from two different fatty acids may be used, as for example, where R contains 15 carbons and R' contains 17 carbons. The commercial compounds available are not chemically pure but are essentially the distearyl alkylene diamides. However, they often contain some of the mono-fatty acid alkylene diamides as well as small amounts of free fatty acids.

The thickening agent of the present invention may be prepared by any of the commonly known methods for preparing amides. For instance, methylene derivatives may be prepared by reacting a fatty acid amide such as stearamide with formaldehyde in the presence of sodium alcohol sulfate having 10 to 16 carbon atoms. The mixture is heated at about 96 degrees for an hour, cooled to 75 degrees at which time HCl is added and stirring continued for an hour at 80 degrees centigrade. Water is subsequently added, the mixture filtered and the cake washed free of acid. The ethylene derivatives may be prepared by condensing one mol of ethylene diamine with two mols of a fatty acid, according to known methods in the art. The propylene and butylene derivatives may be prepared by reacting propylene diamine or butylene diamine with the desired fatty acid such as stearic acid.

Since the thickening agents employed in accordance with the invention have a high degree of compatibility with oils, they may be used with mineral, animal, or vegetable oils. Among the oils that may be used are the hydrocarbons occurring naturally in petroleum. Additionally, hydrocarbon derivatives of petroleum may also be used, among them being polybutene, its derivatives, and its polymers. The oils are generally liquid in the range of from 0° C. to 60° C. Where the mineral oil is to be used in ointments, salves, and cosmetic preparations it is generally first purified. Self-emulsifiable oils may also be used where it is desired to apply the product in the form of an emulsion. Among the animal oils which are compatible is neat's-foot oil, and among the vegetable oils are olive oil, coconut oil, soy bean oil, and many other naturally occurring oils which are liquid at the temperature used.

In making the thickened compositions, the thickening agent and the oil are heated together while stirring to a temperature sufficiently elevated for the thickening agent to dissolve in the oil. This point may be determined by observing the temperature at which the mixture changes from a cloudy one to a clear one. The mixture is then "shock-cooled" to room temperature, during which process the mixture becomes thick. Shock-cooling is carried out by spreading the hot solution as a thin layer over a surface maintained at a low temperature. Generally, shock-cooling from above the cloud point to a temperature below the cloud point such as about 50° C. or lower produces satisfactory results.

When the solution of the oil and the thickening agent is cooled from the elevated temperature, clouding occurs at a more or less definite temperature during which the solution changes from a clear liquid to one which is cloudy or turbid. During this change the thickening agent goes out of true solution and into a colloidally dispersed state in the oil where the particles of the thickening agent are of submicroscopic size. The oil becomes the dispersion medium and the thickening agent the dispersoid. This change of physical condition produces a thixotropic material having the desired properties. Although for most purposes it is desirable that the dispersed particles be of a submicroscopic size, for some purposes a certain amount of granulation or graininess may be tolerated.

For the purpose of the present invention, the cloud point is defined as the temperature at which substantial clouding begins as the clear hot solution is cooled. The cloud range is defined as the temperature range above which the thickening agent is soluble in the oil and below which it is insoluble or substantially insoluble. Where the thickening agent has a sharp melting point and is used in a pure form, the range during which clouding takes place is narrow. However, when the melting temperature is less definite, the clouding process takes place over a wide range.

In using the shock-cooling process for preparing the thickened oil compositions, the temperature of the solution is first adjusted so that it is substantially at or preferably above the cloud point. The temperature is then rapidly lowered through a substantial proportion of the cloud range and preferably through the entire range.

Shock-cooling may be accomplished by one of numerous methods known in the art. In the preferred method the composition is spread out in the form of a film in order that cooling will be rapid and uniform throughout the mass thereof. Layers having thicknesses up to 0.15 inch are suitable. One successful method is to flow the hot solution in the form of a thin layer upon one surface of a sheet of heat-conductive metal such as steel while the opposite surface of the heat-conductive material is being cooled by a fluid such as water. Hollow steel rolls or drums in which a cooling liquid is circulated are satisfactory.

Since the thickened oil compositions produced are thixotropic and exhibit non-Newtonian properties, the viscosities which are obtained at various speeds of the viscometer are expressed as apparent viscosities throughout this specification.

The results obtained by using various rates of shock-cooling are illustrated by the data contained in Table I below. In each case a 5% dispersion of Acrawax C in white mineral oil (340 SUS at 100° C.) was heated and mixed to a temperature of 135° C. The hot mixture was then poured onto a surface which was maintained at the temperature indicated in the table as the cooling surface temperature. The samples were held on the cooling surface for five minutes. They were then allowed to cool on the bench to room temperature. The apparent viscosities obtained at various rotational speeds of a Brookfield viscometer at 25 degrees centigrade and the approximate cooling rate in degrees centigrade are shown. Below the table of data is a description of the appearance of each of the compositions at room temperature.

TABLE I

| No. | Cooling Surface Temperature | Brookfield Apparent Viscosities (Poises) at 25° C. | | | | Cooling Rate, °C./Min. | Appearance |
|---|---|---|---|---|---|---|---|
| | | 10 r.p.m. | 5 r.p.m. | 2 r.p.m. | 1 r.p.m. | | |
| (a) | In beaker exposed to room temperature. | 63 | 86 | 140 | 200 | 2 | Very dull, coarse, grainy, sloppy, oil separating badly. |
| (b) | 113–115° C. | 216 | 272 | 440 | 126 | 126 | Very dull, coarse, grainy, sloppy, slight oil separation. |
| (c) | 103–104° C. | 384 | 480 | 880 | 1,120 | 189 | Very dull, somewhat coarse and grainy, slight oil separation. |
| (d) | 90–92° C. | 560 | 752 | 1,200 | 1,360 | 264 | Moderately dull, a little grainy, oil separates only in depressions. |
| (e) | 134° C. | 476 | 709 | 1,400 | 2,496 | 1,148 | Smooth, glossy, more translucent than the others. Oil firmly held.pp |

As can be seen from the data above, where graininess and dullness are not objectionable, but where substantial freedom from oil separation is desirable, cooling rates above approximately 125 degrees centigrade per minute should be used. On the other hand, where smooth glossy and translucent compositions are desired together with good oil retaining properties, cooling rates of above approximately 1,000 degrees per minute give excellent results. Properties within the two extremes may be obtained by using cooling rates within the indicated range. It is important that the cooling rate extend through the cloud range for optimum results.

When a thickened oil composition stands for an extended period of time, there is a tendency for some of it to bleed, that is, for some of the oil to segregate. A test to determine freedom from bleeding of a thickened oil composition may be carried out by forming a conical cavity in the composition in the form of an inverted right circular cone of predetermined dimensions. The composition is then allowed to stand for a period at the temperature selected for testing. The amount of oil which lies segregated is then measured. This figure gives an indication of the degree of bleed. In the preferred method a small jar having an inside diameter of 1⅞″ is filled with the material to be tested. The surface is depressed to form an inverted right circular cone, the base of which is substantially coextensive with the inside diameter of the jar, and the genetrix of which is at a 45 degree angle to the base. The material is allowed to stand for 15 hours at a temperature of 50° C. At the end of that time the liquid in the cavity is poured off and weighed. Where the amount of oil collected at the apex of the cone-shaped cavity in the bleed test is more than 0.2 gram, the material is considered to be generally unsatisfactory for many commercial uses where freedom from bleeding is required. Where the bleed is between 0.1 and 0.2 gram, the material is satisfactory for most uses. Where it is less than 0.1 gram, the material is considered to be exceptionally stable and satisfactory for all commercial uses. The thickened oil compositions of this invention have shown unusually good resistance to bleeding. A thickened mineral oil composition made by shock-cooling and containing 6% "Acrawax C," when subjected to the above test, showed a bleed of only 0.0312 g.

The amide wax thickening agent may be used in amounts as little as about 0.25% by weight of the total of the thickener and oil and up to about 30%. If less than 0.25% is used, the composition formed will not be suitable for most commercial uses. If a concentration greater than about 30% is used, the composition becomes too thick and additionally loses some of the desirable properties normally imparted by the shock-cooling method of preparing the composition.

The following examples serve to illustrate the preparation of the compositions of the present invention. Unless otherwise noted, proportions are expressed either in percent by weight or parts by weight.

Example 1

A mixture of 5% Armowax and 95% Superla No. 34 (340 SUS at 100° F. white mineral oil) was heated to just above the cloud point of 117.5° C. The material was shock-cooled by spreading it out in a thin layer on a precooled surface. The cooling rate was from about 350° to 400° C. per minute. The shock cooled product was glossy, translucent, and very smooth and stable. It was also found to be thixotropic. Table I shows the various measurements of apparent viscosity in poises at 22° C. obtained at the indicated speeds of the rotating cylinder of the Brookfield viscometer.

TABLE II

| R.p.m. | 10 | 5 | 2 | 1 |
|---|---|---|---|---|
| Viscosity (Poises) | 134 | 208 | 412 | 740 |

Example 2

A mixture of 5% Acrawax C and 95% Superla No. 34 was heated until a clear solution resulted. The solution was then shock-cooled on a water-cooled roll operated at 14 r.p.m. The temperature of the solution before making contact with the roll was 134° C. and the cooled material left the roll at a temperature of 52° C., constituting a cooling rate of 1148° C. per minute. Table II shows the resulting viscosity at 22.6° C. obtained from testing the thickened composition with a Brookfield viscometer at various testing speeds.

TABLE III

| R.p.m. | 10 | 5 | 2 | 1 |
|---|---|---|---|---|
| Viscosity (Poises) | 670 | 1,036 | 2,070 | 3,860 |

It can be seen from the table that the material was highly thixotropic. It was colorless, smooth, glossy, and tacky.

A second run was made in which the water flow through the roll was reduced in order to reduce the rate of cooling and raise the take off temperature. Here the temperature of the solution applied to the roll was 140° C. and the temperature at the time of leaving the roll was 56–60° C. The following viscosities were obtained at 20.5° C.

TABLE IV

| R.p.m. | 10 | 5 | 2 | 1 |
|---|---|---|---|---|
| Viscosity (Poises) | 476 | 709 | 1,400 | 2,496 |

Example 3

A mixture of 5% Advawax 280 (N,N'-ethylene bisstearamide) and 95% white mineral oil was heated to above the cloud point and shock-cooled as described in Example 2. The resulting apparent viscosities at 24.5° C. are shown in Table V below.

TABLE V

| R.p.m. | 10 | 5 | 2 | 1 |
|---|---|---|---|---|
| Viscosity (Poises) | 480 | 752 | 1,530 | 2,680 |

Example 4

A low wax content material was made by heating to above the cloud point and shock cooling as previously described the following composition:

0.40 Acrawax C
0.24 glyceryl monostearate
0.40 WS1925 (polybutene dispersion in lubricating oil)
98.96 white mineral oil distillate (305 SUS at 100° F.)

The resulting material was a "dripless" oil having a viscosity of 11 poises at 25° C. It was suitable for use as a push-button type chassis lubricant. It was fluid over a wide temperature range, and showed good moisture resistance and excellent lubricating properties.

Example 5

A light lubricating grease suitable for general household use and which can be dispensed from a collapsible tube was prepared by heating to above the cloud point and shock-cooling as in Example 2 a mixture comprised of five parts Acrawax C, three parts glyceryl monostearate and 92 parts white mineral oil (350 SUS at 100° F.). A stable thixotropic grease resulted which was resistant to moisture and which had rust-inhibiting properties. Its apparent viscosity at 25° C. was 1080 poises.

Example 6

A non-washable impingement type filter adhesive was prepared by mixing together 2% Acrwax C with 98% Deep Rock oil (300 SUS mineral oil at 100° F.), heating the mixture to above the cloud point and then shock-cooling as described above. Table VI below shows the viscosities obtained using a Brookfield viscometer at various speeds at a temperature of 23.4° C.

TABLE VI

| R.p.m. | 10 | 5 | 2 | 1 |
|---|---|---|---|---|
| Viscosity (Poises) | 176 | 308 | 692 | 1,172 |

Example 7

A washable impingement type filter adhesive was prepared by heating 5 parts Acrawax C, 95 parts Gascon B (300 SUS at 100° F.), and 100 parts Petromix 9 (sulfonated mineral oil emulsifier) to above the cloud point and subsequently shock-cooling the mixture. The apparent viscosity at 25° C. was 1100 poises. An emulsion was then formed by adding two parts of water to one part of adhesive and stirring rapidly. This emulsion was then applied to panel type air filters by spraying or dipping. After the water evaporated, a thin film of adhesive remained which was very efficient in collecting dust, and which could be readily washed off with running water at room temperature.

*Example 8*

A zinc oxide ointment was prepared by first heating together five parts by weight of Acrawax C with 76 parts U.S.P. heavy liquid petrolatum until a clear liquid had formed at 130° C., and then stirring to produce a uniform solution. The solution was cooled in the form of a film 0.02 inch thick on a roll at a rate of 1000° C. per minute to a take-off temperature of 50° C. Twenty parts zinc oxide powder, U.S.P., were then added and intimately mixed together with the thickened oil, completing the processing on a roller mill. The resulting product was highly resistant to bleeding and stable over a wide temperature range. Its appearance was glossy, white, and extremely smooth. It was easy to apply and had an apparent viscosity of about 7000 poises at room temperature.

*Example 9*

A mixture of 8% Acrawax C and 92% polybutene having a molecular weight of 370 and a viscosity of 335 SUS at 100° F. was heated to above the cloud point of 112° C. and then shock-cooled. The resulting mixture had a viscosity of less than 7700 poises at 25° C., and was suitable for use as a base for ointments.

*Example 10*

A non-drying base for ointments and cosmetics was prepared by heating the following mixture to above a cloud point of 111° C. and rapidly cooling in a thin film on a precooled surface:

| | Parts |
|---|---|
| Acrawax | 7.5 |
| White mineral oil | 79.0 |
| Diethyl succinate | 9.0 |
| 2-octanol | 4.5 |

The resulting product was smooth and glossy and was an excellent skin softener and non-drying base for ointments and cosmetics. The apparent viscosity was 3360 poises at 26° C.

*Example 11*

A skin cream was prepared by heating together 5% Acrawax C and 95% dioctyl sebacate and then shock-cooling the solution. A glossy smooth white cream resulted.

*Example 12*

An ointment was made by heating together 7% Acrawax C, 50% methyl salicylate, and 43% liquid petrolatum to above the cloud point and shock-cooling. The mixture assumed a red hue which disappeared after standing two weeks, becoming a light cream color. The apparent viscosity at 25° C. after aging for nineteen days was as follows:

TABLE VII

| R.p.m. | 10 | 5 | 2 | 1 |
|---|---|---|---|---|
| Viscosity (Poises) | 2,480 | 4,240 | 8,800 | 13,840 |

*Example 13*

A heavy grease was prepared in the same manner as in Example 2 above using 8% Acrawax C and 92% Deep Rock oil No. 4165, a mineral oil having a viscosity of 3455 SUS at 100° F. The resulting shock-cooled compound was suitable for use as a heavy grease.

*Example 14*

An alternative method for shock-cooling an oil wax composition was carried out by first cooling 50 grams of Superla No. 34 (340 SUS white oil) to —9° C. Another mixture of 45 grams of Superla No. 34 and 5 grams Acrawax C were mixed together and heated to a temperature of 124° C. The hot solution was then poured into the cold oil with vigorous stirring. The temperature after the addition and mixing was 52° C. The preparation had a low viscosity and could be readily poured.

*Example 15*

The following series of tests was carried out to compare the relative oil compatibility of the thickening agent of the present invention with the oil compatability of the thickening agents known in the art. The object of the tests was to dissolve the wax in the oil at an elevated temperature and subsequently shock-cool the mixture to form a uniform thickened oil composition having a smooth uniform consistency and being thixotropic. In the table below, where the properties of the material are described as "good," a smooth, thixotropic composition was formed having uniform consistency. Where only a coarse granular material was obtained, they are indicated as unsatisfactory. Compounds which were intermediate in these properties are designated as fair or poor. Ozokerite is a microcrystalline wax. DYNH is a polyethylene polymerized by a high pressure method and having an everage molecular weight of about 21,000. In the tests, hydrogenated castor oil in capryl alcohol made a coarse, grainy, bleeding product. It set very slowly after shock-cooling. In the case of the butanediol the hydrogenated castor oil did not completely dissolve in the hot liquid, and after shock-cooling, a grainy, unstable product resulted. With pine oil, the hydrogenated castor oil made a coarse, grainy, transparent, but unstable product which set up very slowly and bled. With tetraethylene gylcol, the hydrogenated castor oil was not compatible even when melted and no thickening could be accomplished. With tributyl phosphate the hydrogenated castor oil made a coarse bleeding product. The other results are shown in the table.

TABLE VIII

| Liquid | Acrawax C | Fully Hydrogenated castor oil | Ozokerite | Polyethylene DYNH |
|---|---|---|---|---|
| Capryl alcohol | good | poor | fair | unsatisfactory. |
| 1,3-Butanediol | do | do | unsatisfactory. | Do. |
| Oil of wintergreen | do | fair | do | Do. |
| Pine oil | do | poor | good | Do. |
| Tetraethylene glycol | do | unsatisfactory. | unsatisfactory. | Do. |
| Mineral oil | do | good | good | good. |

It can be seen from the table that where mineral oil was used, all thickeners proved to be satisfactory. In the case of liquids such as pine oil, only Acrawax C and ozokerite proved to be satisfactory. In the case of four of the oils, capryl alcohol, 1,3 butanediol, oil of wintergreen, and tetraethylene glycol, only the Acrawax C was satisfactory.

The fact that the amide waxes of the present invention will form thickened oils which are usable at higher temperatures is illustrated by Table VIII which shows cloud points for compositions of white mineral oil with various thickeners. High cloudpoints indicate that the material may be used at elevated temperatures without loss of gel properties.

TABLE IX

| Thickening Agent | Cloud Point, ° C. |
|---|---|
| 5% Acrawax C | 124 |
| 16% Microcrystalline wax | 73 |
| 5% Hi-D Polyethylene (Vicat 235° F.) | 100 |
| 10% Hydrogenated castor oil | 84 |

As can be seen the 5% Acrawax C thickened composition has by far the highest cloud point. Consequently, it may function as a thickeneing agent at a much higher temperature than the agents used in the art before becoming liquid. The compositions prepared above contain the indicated amounts of thickening agents and were produced by dissolving the thickener in the oil at a temperature above the cloud point and subsequently shock-cooling. The superiority of the diamide waxes over conventional thickening agents is further illustrated by the following experiment. A solution of 7% Acrawax C and 93% mineral oil was prepared at elevated temperature and shock-cooled. A similar preparation was made using polyethylene instead of Acrawax C. At 0° C. the Acrawax C-thickened product has a somewhat lower viscosity than the polyethylene-thickened product. At 75° C. the Acrawax C-thickened product has a viscosity of 2040 poises compared to 1100 for the polyethylene-thickened product. At 100° C. the Acrawax C-thickened oil still had good ointment-like consistency, while the polyethylene-thickened material was a clear liquid at that temperature and completely unsuited for use as an ointment. The ability of oils thickened with diamide waxes to maintain their consistency at elevated temperatures is an important property where use at those temperatures is necessary. Examples of such uses are as adhesives for hot gas filters or oils and greases for elevated temperature use.

In addition to those described above, there are many other uses for the thickened oil of this invention such as the impregnation of paper for use as wrapping sheets, coating paper for translucent windows, carbon paper coatings and printing inks, vehicles for cattle insect sprays and agricultural sprays, and ingredients in polishes, adhesives, and leather finishes.

Although in the foregoing examples the diamide waxes of the present invention have been used as the sole thickening agents, they can of course be used in conjunction with other thickening agents where special properties are desired and such use is to be considered as falling within the spirit and scope of the present invention except as limited by the appended claims.

I claim:
1. A thickened oil composition consisting essentially of a liquid oil base and a minor proportion of a thickening agent in an amount sufficient to impart thixotropic properties to said composition, said thickening agent being present in said base in the physical form resulting from solution thereof in said base at elevated temperature and shock-cooling said solution, said thickening agents consisting of a compound having the structural formula:

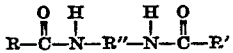

wherein R and R' are alkyl groups containing 15 to 17 carbo atoms and R" is an alkylene group containing from 1 to 4 carbon atoms.

2. A thickened oil composition consisting essentially of a liquid oil base and a thickening agent present in said base in the physical form resulting from solution thereof in said base at elevated temperature and shock-cooling said solution, said thickening agent consisting of N,N'-methylene bis-stearamide in an amount from about 0.25% to about 30% by weight of said thickened oil composition.

3. A thickened oil composition consisting essentially of a liquid oil base and a thickening agent present in said base in the physical form resulting from solution thereof in said base at elevated temperature and shock-cooling said solution, said thickening agent consisting of N,N'-ethylene bis-stearamide in an amount from about 0.25% to about 30% by weight of said thickened oil composition.

4. A thickened oil composition consisting essentially of a liquid oil base and a thickening agent present in said base in the physical form resulting from solution thereof in said base at a temperature at least equal to the cloud point temperature and shock-cooling said solution, said thickening agent consisting of a compound having the structural formula:

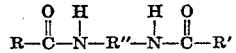

wherein R and R' are alkyl groups containing 15 to 17 carbon atoms and R" is an alkylene group containing from 1 to 4 carbon atoms, said thickening agent being present in an amount from about 0.25% to about 30% by weight of said thickened oil composition.

5. A thickened oil composition according to claim 4 wherein said thickening agent is N,N'-methylene bis-stearamide.

6. A thickened oil composition according to claim 4 wherein said thickening agent is N,N'-ethylene bis-stearamide.

7. A method for the production of a thickened oil composition which comprises preparing a solution consisting essentially of a liquid oil base and a thickening agent at a temperature at least equal to the cloud point temperature and shock-cooling said solution, said thickening agent consisting of a compound having the structural formula:

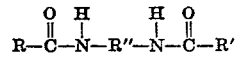

wherein R and R' are alkyl groups containing 15 to 17 carbon atoms and R" is an alkylene group containing from 1 to 4 carbon atoms, the thickening agent being present in an amount from about 0.25% to about 30% by weight of said thickened oil composition.

8. A method according to claim 7 wherein said thickening agent is N,N'-methylene bis-stearamide.

9. A method according to claim 7 wherein said thickening agent is N,N'-ethylene bis-stearamide.

10. A method for the production of the thickened oil composition which comprises preparing a solution consisting essentially of a liquid oil base and a thickening agent at a temperature at least equal to the cloud point temperature and shock-cooling said solution through a substantial proportion of the cloud point range, said thickening agent consisting of a compound having a structural formula:

wherein R and R' are alkyl groups containing 15 to 17 carbon atoms and R" is an alkylene group containing from 1 to 4 carbon atoms, the thickening agent being present in an amount from about 0.25% to about 30% by weight of said thickened oil composition.

References Cited in the file of this patent

UNITED STATES PATENTS

| | | |
|---|---|---|
| 1,937,463 | Nill | Nov. 28, 1933 |
| 2,393,800 | Morgan et al. | Jan. 29, 1946 |
| 2,514,145 | Stevens | July 4, 1950 |
| 2,569,575 | Philipps | Oct. 2, 1951 |
| 2,622,067 | White et al. | Dec. 16, 1952 |
| 2,638,180 | Herkimer | May 12, 1953 |
| 2,762,755 | Foehr | Sept. 11, 1956 |
| 2,789,093 | Foehr | Apr. 16, 1957 |
| 2,828,263 | Worth | Mar. 25, 1958 |
| 2,830,955 | Dixon | Apr. 15, 1958 |

OTHER REFERENCES

"Chemicals by Glyco," Glyco Prod. Co. Inc., N.Y. Copyright 1944, pages 69 and 70.